US012415715B2

(12) United States Patent
Bhutani et al.

(10) Patent No.: US 12,415,715 B2
(45) Date of Patent: Sep. 16, 2025

(54) SYSTEMS AND METHODS FOR DISPENSING A BEVERAGE

(71) Applicant: PepsiCo, Inc., Purchase, NY (US)

(72) Inventors: Gurmeet Singh Bhutani, Gurgaon (IN); Rahul Sadashiv Kamble, Faridabad (IN)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 18/167,646

(22) Filed: Feb. 10, 2023

(65) Prior Publication Data

US 2023/0183052 A1 Jun. 15, 2023

Related U.S. Application Data

(63) Continuation of application No. 17/046,602, filed as application No. PCT/US2019/027497 on Apr. 15, 2019, now Pat. No. 11,584,631.

(30) Foreign Application Priority Data

Apr. 26, 2018 (IN) ............................. 201841015764

(51) Int. Cl.
*B67D 1/08* (2006.01)
*B67D 1/00* (2006.01)
(Continued)

(52) U.S. Cl.
CPC ......... *B67D 1/0069* (2013.01); *B67D 1/0021* (2013.01); *B67D 1/004* (2013.01);
(Continued)

(58) Field of Classification Search
CPC .... B67D 1/0069; B67D 1/1281; B67D 1/004; B67D 1/0859; B67D 1/0021; B67D 1/12;
(Continued)

(56) References Cited

U.S. PATENT DOCUMENTS 2,978,143 A 4/1961 Arnett
4,773,561 A 9/1988 Sedam
(Continued)

FOREIGN PATENT DOCUMENTS

JP 2003-192099 A 7/2003
JP 2014-015218 A 1/2014

OTHER PUBLICATIONS

International Search Report and Written Opinion of the International Searching Authority for International Application No. PCT/US2019/027497, mailed Jul. 2, 2019, 11 pages.

*Primary Examiner* — Charles P. Cheyney
(74) *Attorney, Agent, or Firm* — Sterne, Kessler, Goldstein & Fox P.L.L.C.

(57) ABSTRACT

Beverage dispensers are disclosed. A beverage dispenser may include a carbonation pump, pressure tank, and a pressure switch configured to active the pressure pump when a pressure in the pressure tank falls below a threshold pressure. The pressure switch may cause the carbonation pump to shut off when the pressure in the pressure tank exceeds an upper threshold pressure. The beverage dispenser may be convertible from a carbonated beverage dispenser to a non-carbonated beverage dispenser.

21 Claims, 6 Drawing Sheets

(51) Int. Cl.
*B67D 1/10* (2006.01)
*B67D 1/12* (2006.01)

(52) U.S. Cl.
CPC ............. *B67D 1/0859* (2013.01); *B67D 1/10* (2013.01); *B67D 1/1281* (2013.01)

(58) Field of Classification Search
CPC .............. B67D 1/10; B67D 2001/0097; B67D 2001/082
See application file for complete search history.

(56) References Cited

U.S. PATENT DOCUMENTS

| | | | | |
|---|---|---|---|---|
| 5,314,091 | A | 5/1994 | Credle, Jr. | |
| 5,411,179 | A * | 5/1995 | Oyler | B67D 1/0462 222/399 |
| 5,538,160 | A | 7/1996 | Ziesel | |
| 5,556,066 | A | 9/1996 | Sano | |
| 5,842,600 | A | 12/1998 | Singleterry | |
| 5,855,296 | A | 1/1999 | McCann | |
| 5,858,248 | A | 1/1999 | Plester | |
| 6,732,885 | B2 | 5/2004 | Mathues | |
| 6,820,763 | B2 | 11/2004 | Bilskie | |
| 7,077,293 | B2 | 7/2006 | McCann | |
| 7,905,373 | B2 | 3/2011 | Beavis | |
| 7,918,156 | B2 | 4/2011 | Greenwald | |
| 8,424,725 | B2 | 4/2013 | Boyer | |
| 8,434,642 | B2 | 5/2013 | Rudick | |
| 8,485,394 | B2 | 7/2013 | Tachibana | |
| 8,584,900 | B2 | 11/2013 | Metropulos | |
| 10,343,887 | B2 | 7/2019 | Bhutani | |
| 10,351,411 | B2 | 7/2019 | Ziesel | |
| 2002/0033027 | A1 | 3/2002 | Ubidia | |
| 2007/0114243 | A1 * | 5/2007 | Kershaw | B67D 1/0869 222/129.1 |
| 2010/0276451 | A1 | 11/2010 | Tachibana | |
| 2011/0073618 | A1 | 3/2011 | Anderson et al. | |
| 2014/0263416 | A1 | 9/2014 | Green | |
| 2016/0325977 | A1 | 11/2016 | Peirsman | |
| 2017/0081163 | A1 * | 3/2017 | Gatipon | B67D 1/0078 |
| 2017/0088410 | A1 * | 3/2017 | Wing | B67D 1/0076 |
| 2017/0095757 | A1 | 4/2017 | Meza | |
| 2017/0233235 | A2 | 8/2017 | Kleinrichert | |
| 2018/0044157 | A1 | 2/2018 | Cohen | |

* cited by examiner

SYSTEMS AND METHODS FOR DISPENSING A BEVERAGE

CROSS-REFERENCE

This application is a continuation of U.S. application Ser. No. 17/046,602, filed Oct. 9, 2020, which is a national stage entry of PCT/US2019/027497, filed Apr. 15, 2019. Each of these applications is incorporated herein in their entirety by reference thereto.

BACKGROUND

Field of the Invention

Embodiments of the present invention relate generally to beverage dispensers, including carbonated beverage dispensers and non-carbonated beverage dispensers.

BRIEF SUMMARY OF THE INVENTION

According to some disclosed embodiments, a method of converting a carbonated beverage dispenser to a non-carbonated beverage dispenser includes disconnecting a carbonation tank from fluid communication with the beverage dispenser and installing a pressure tank. The pressure tank may be installed in fluid communication with a carbonation pump and mixing nozzle of the beverage dispenser. The mixing nozzle may dispense the beverage from the beverage dispenser. A pressure switch may also be installed to monitor a pressure in the pressure tank. The pressure switch may actuate the carbonation pump when the pressure in the pressure tank falls below a lower threshold pressure. The pressure switch may also shut off the carbonation pump once the pressure increases above an upper threshold pressure. A pressure regulator may also be installed to regulate the pressure in the beverage supply line. The pressure tank may be a hydro-pneumatic tank.

A beverage dispenser according to some embodiments may include a carbonation pump fluidly coupled to a water source by a beverage supply line. A pressure tank, monitored by a pressure switch, may be fluidly coupled to the beverage supply line. A mixing nozzle may be located at one end the beverage supply line. The pressure switch may monitor a pressure in the pressure tank. The pressure switch may actuate the carbonation pump to increase the pressure in the pressure tank when the pressure falls below a lower threshold pressure and may shut off when the pressure in the tank exceeds an upper pressure threshold.

A beverage dispenser may also comprise a syrup source configured to add syrup to the mixing nozzle. A pre-chilling coil and a post-chilling coil may be in line with the beverage supply line to cool a temperature of the beverage before it is dispensed. The beverage dispenser may include solenoid valves configured to release water from the beverage supply line into the mixing nozzle. A solenoid valve may also release syrup in to the mixing nozzle. The syrup may be pumped from a syrup source using a syrup pump. The syrup may also travel through a syrup chilling coil prior to being released into the mixing nozzle. The syrup chilling coil may lower the temperature of the syrup before it is added to the mixing nozzle so a cooler beverage can be dispensed to the user. According to some embodiments, a second syrup source may be added to the beverage dispenser. The second syrup source may be integrated into the beverage dispenser in much the same way as the first syrup source. Additional syrup sources may also be added.

According to some embodiments, one or more mixing nozzles may be used with the beverage dispenser. Each nozzle may have its own syrup source. Also, a syrup source may serve one or more mixing nozzles.

According to some embodiments, a method of dispensing a non-carbonated beverage from a carbonated beverage dispenser includes actuating a carbonation pump to increase a pressure in the pressure tank. The carbonation pump may be configured to shut off when a pressure in the pressure tank is above an upper threshold pressure. In some embodiments, the pressure tank may discharge the pressure into the beverage supply line in response to a user actuating a dispensing mechanism of the beverage dispenser. Actuating the dispensing mechanism releases the beverage from the beverage dispenser.

A method of dispensing a beverage may also include dispensing a predetermined amount or volume of a beverage from the beverage dispenser. A method may also include adding a syrup to the beverage supply line to in response to the user activating the dispensing mechanism. A syrup may be added with a syrup pump. The syrup may be routed through a syrup-chilling coil to lower the temperature of the syrup.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF THE INVENTION

Reference will now be made in detail to representative embodiments. Some embodiments will be illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the claims.

The present disclosure is directed to beverage dispensing systems and methods of dispensing beverages. Beverage dispensers are used in wide variety of settings including concessions, convenience stations, and restaurants. Beverage dispensers are economical and visually attractive ways of storing and combining beverage components. A wide variety of beverage products including, but not limited to, carbonated beverages, non-carbonated beverages, juices, flavored waters, and others may be dispensed from beverage dispensers. Carbonated beverages may include soft drinks, such as, for example, Pepsi©. Non-carbonated beverages may include tea, such as iced-tea, for example, Pure Leaf©.

Beverage dispensers may include several components for preparing a beverage. The components may differ depending on the type of beverage, or specific beverage, that will be dispensed. For example, a carbonated beverage dispenser may require a carbonation tank and carbonation pump. Because beverage dispensers require components specific to the beverage product that will be dispensed, operators of beverage dispensers may have relatively limited options for adapting a beverage dispenser originally intended for one type of beverage product for use with another type of beverage.

Beverage components may include water, syrups, and carbon dioxide gas, among other. Beverage dispensers may combine beverage components to make a beverage. Beverage dispensers may also offer levels of customization to a beverage user. For example, more than one syrup may be added to a beverage. For example, a base flavor syrup may be added to water to make a beverage. The base flavor may be, for example, a lemon-lime flavor. A second flavor syrup may be added to the beverage to change the flavor of the dispensed beverage. For example, a user may add a cherry flavor to change, or customize, the beverage dispensed.

A carbonated beverage dispenser may include specific components to combine the beverage components of a carbonated beverage. A carbonated beverage may be made with water infused with carbon dioxide gas and a syrup. The carbonated beverage may be dispensed from a beverage dispenser that includes a carbonation source, a water source and syrup source. The carbonation source may be, for example, a canister of compressed carbon dioxide gas. The water source may be, for example, a water faucet connected to a municipal water supply or the like.

Figure 1:
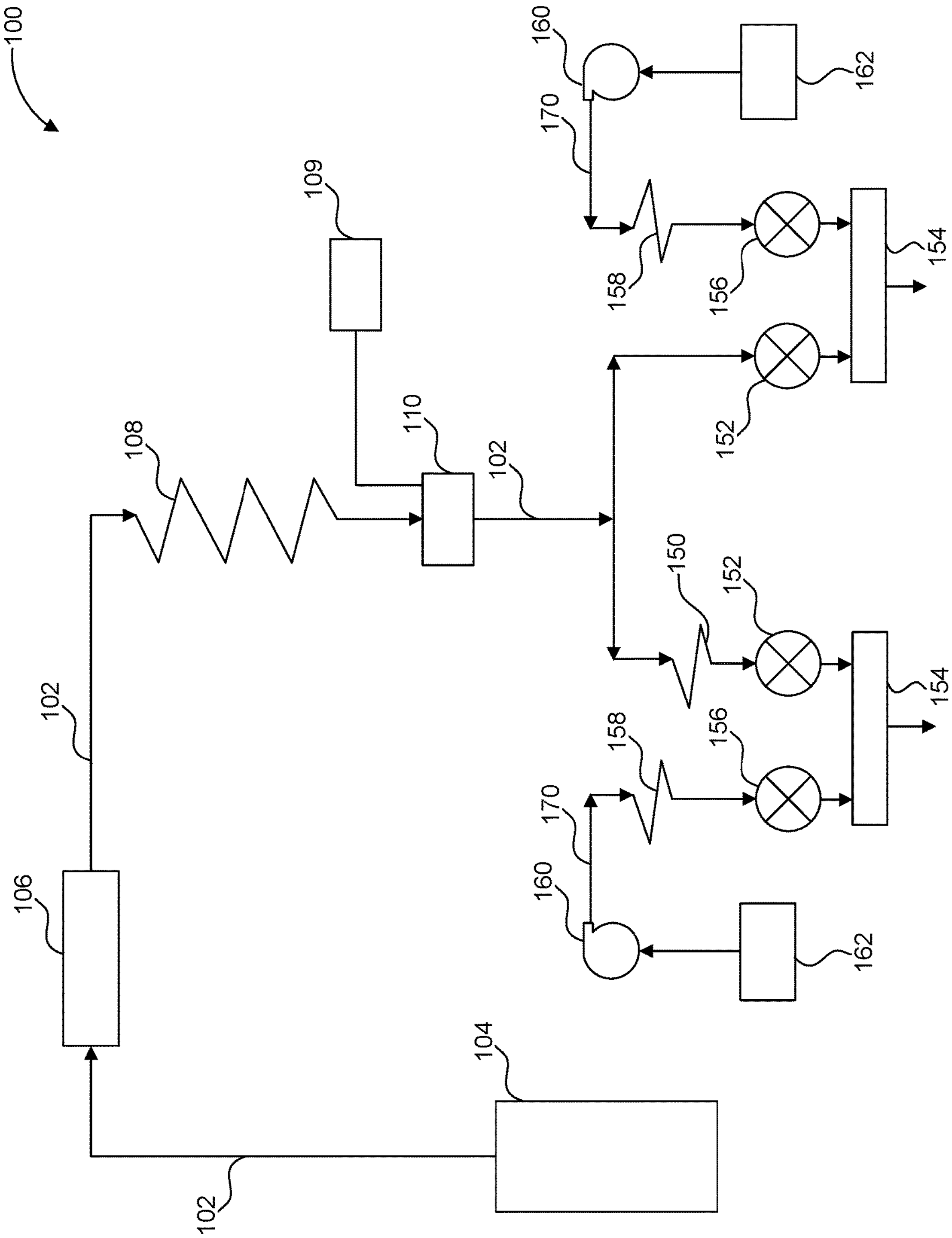
FIG. 1 shows a schematic of a carbonated beverage dispenser according to some embodiments.

FIG. 1 shows a schematic of a carbonated beverage dispenser 100 according to some embodiments. Carbonated beverage dispenser 100 includes a beverage supply line 102. Beverage supply line 102 fluidly couples components of carbonated beverage dispenser 100 to one another. The arrows shown on beverage supply line 102 show a direction of travel of beverage components within the beverage dispenser. As shown in FIG. 1, beverage supply line 102 is fluidly coupled to a water source 104. Beverage supply line 102 terminates at mixing nozzle 154. Mixing nozzle 154 dispense the carbonated beverage from carbonated beverage dispenser 100. Mixing nozzle 154 may also mix beverage components together as the carbonated beverage is dispensed.

Beverage dispensers require pumps or other mechanisms to drive a beverage or beverage component through the beverage dispenser. In a carbonated beverage dispenser, the carbonation pump drives the beverage through the beverage dispenser. In a carbonated beverage dispenser, a carbonation pump pumps water into a carbonation tank. The carbonation tank is connected to a carbon dioxide supply to supply the carbonation tank with carbon dioxide gas. Once the carbon dioxide gas and water are in the carbonation tank, the carbon dioxide gas diffuses into the water to form carbonated water. The carbonation tank not only carbonates the water, but because the tank is pressurized, the pressure tank also acts to force a beverage out of the beverage dispenser.

The carbonation pump may operate when a user of the beverage dispenser engages a dispensing mechanism. The dispensing mechanism may be located under the mixing nozzle of the beverage dispenser. The dispensing mechanism may be a lever, button, or other user interface device. The activation mechanism opens one or more valves of the beverage dispenser to dispensing a beverage to the user.

As shown in FIG. 1, carbonated beverage dispenser 100 includes a carbonation pump 106. Carbonation pump 106 drives a beverage from water source 104 through beverage supply line 102 to a carbonation tank 110. Before water reaches carbonation tank 110, it may be routed through other components. For example, as shown in FIG. 1, water may travel a pre-chilling coil 108. Pre-chilling coil 108 lowers the temperature of the water before it reaches carbonation tank 110. This additional cooling step gives the operator more temperature options for dispensing the beverage.

Carbonation pump 106 also pumps carbon dioxide gas into carbonation tank 110. FIG. 1 show a carbon dioxide gas source 109 operatively coupled to carbonation tank 110. As water and carbon dioxide gas are pumped into carbonation tank, the carbon dioxide gas dissolves in the water to created carbonated water. Carbonated water leaves carbonation tank 110 through beverage supply line 102. In some embodiments, carbonated water may move through post-chilling coil 150 which lowers the temperature of the carbonated water prior to dispensing. A solenoid value 152 fluidly coupled to beverage supply line 102 releases carbonated water from beverage supply line 102 into a mixing nozzle 154. Mixing nozzle 154 mixes beverage components, such as the carbonated water and syrup, and dispenses the ready-made beverage to a user.

In addition to water supplied by beverage supply line 102, a syrup system may also supply a syrup to the beverage. As shown in FIG. 1, the syrup system includes a syrup source 162. A syrup pump 160 pumps syrup from syrup source 162 through a syrup supply line 170 to a syrup solenoid valve 156. Syrup solenoid valve 156 dispenses a measured amount of syrup into mixing nozzle 154. In some embodiments, the syrup may also be routed through a syrup chilling coil to reduce the temperature of the syrup. The beverage dispensed from mixing nozzle 154 is a combination of water from beverage supply line 102 and syrup.

A carbonated beverage dispenser according to some embodiments may be converted into a non-carbonated beverage dispenser. According to some methods, a carbonated beverage dispenser may be converted into a non-carbonated beverage dispenser by removing the carbonation tank from the beverage dispenser. The carbonation tank may be physically removed from the beverage dispenser, for example, by disconnecting the carbonation from the beverage supply lines and removing it from the beverage dispenser's housing, or the carbonation tank may be operatively removed from the beverage dispenser. The carbonation tank may be operatively removed the beverage dispenser by means of a shut off valve or flex valve fluidly located between the carbonation tank and the beverage supply line.

Figure 2:
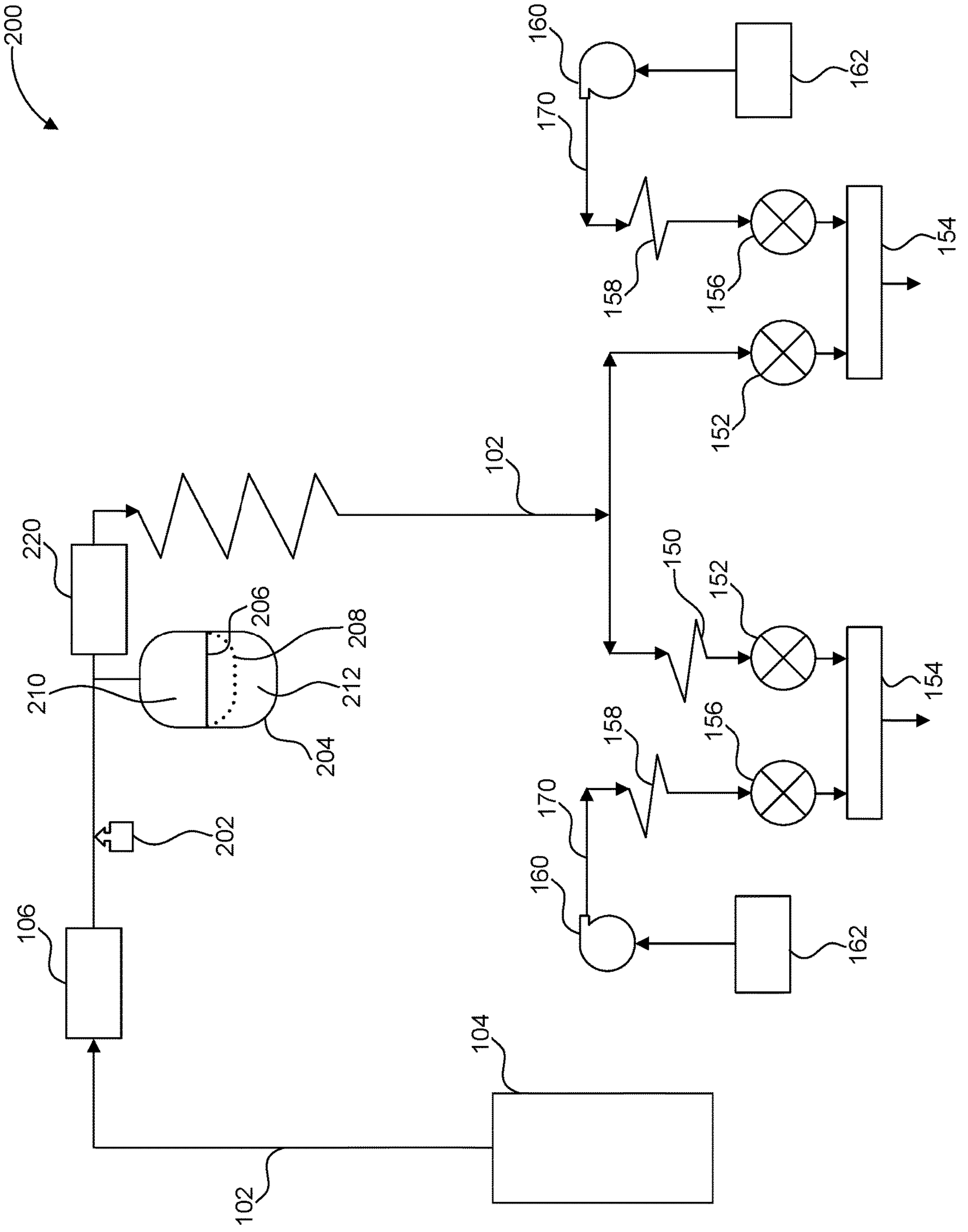
FIG. 2 shows a schematic of a non-carbonated beverage dispenser according to some embodiments.

FIG. 2 shows a schematic of beverage dispenser 200 according to some embodiments. Beverage dispenser 200 may be a converted carbonated beverage dispenser, such as the embodiment shown in FIG. 1. As such, components of beverage dispenser 200 are similar to those of beverage dispenser 100.

A method of converting a carbonated beverage dispenser to a non-carbonated beverage dispenser may include installing a pressure tank in the beverage dispenser. The pressure tank may be fluidly coupled to the beverage supply line between the mixing nozzle of the beverage dispenser and carbonation pump. The pressure tank may be fluidly connected to the beverage supply line with a shut off valve or flex valve. With the shutoff valve or flex valve, an operator may quickly add or remove the pressure tank from the beverage supply line without installing or uninstalling the pressure tank.

In operation, the converted non-carbonated beverage dispenser uses the carbonation pump to increase a pressure of the pressure tank. The pressure tank includes a diaphragm that separates a first and a second chamber of the pressure tank. The first chamber may be fluidly coupled to beverage supply line 102 and the second chamber is closed off and includes a compressible fluid, such as, for example, air. When the carbonation pump is activated and solenoid valve 152 is closed, the carbonation pump pumps water into the first chamber of the pressure tank. As more water enters the first chambers, the diaphragm is displaced into the second chamber of the tank. The diaphragm thus pressurizes the system. Therefore, even when the carbonation pump is off, a beverage may still be dispensed from the beverage dispenser because the pressure tank pushes the water through the beverage dispenser.

As shown in FIGS. 1 and 2, a carbonated beverage dispenser may be converted to a non-carbonated beverage dispenser by removing carbonation tank 110 and adding a pressure tank 204. Pressure tank 204 includes a diaphragm 206 separating a first chamber 210 and a second chamber 212. First chamber 210 is fluidly coupled to beverage supply line 102. Activating carbonation pump 106 forces water from water source 104 into first chamber 210 of pressure tank 204. As water is added to first chamber 210 of pressure tank 204, diaphragm 206 is displaced into second chamber 212. This increase the potential energy of diaphragm 206 by increasing the pressure of a fluid in second chamber 212. The fluid in second chamber 212 may be air, nitrogen, or a similar compressible fluid. In this way, pressure tank 204 is a hydro-pneumatic tank. FIG. 2 shows a line 208 representing a displacement of diaphragm 206. Thus, when a user of the beverage dispenser activates the dispensing mechanism to release a beverage, the pressured fluid in second chamber 212 and inherent tension in diaphragm 206 advances water through beverage supply line 102 and is expelled through mixing nozzle 154.

The dispensing mechanism may be integral to mixing nozzle 154. The dispensing mechanism may be actuated by a mechanical toggle or an electrical signal. For example, an operator may select a beverage size option from a menu of options. In response to a selected size, mixing nozzle 154 may dispense a specific volume of beverage. For example, if an operator selects a button labeled "Large," 16 fluid ounces of beverage may be dispensed. If an operator selects a button labeled "Small," 8 fluid ounces of beverage may be dispensed.

Figure 5:
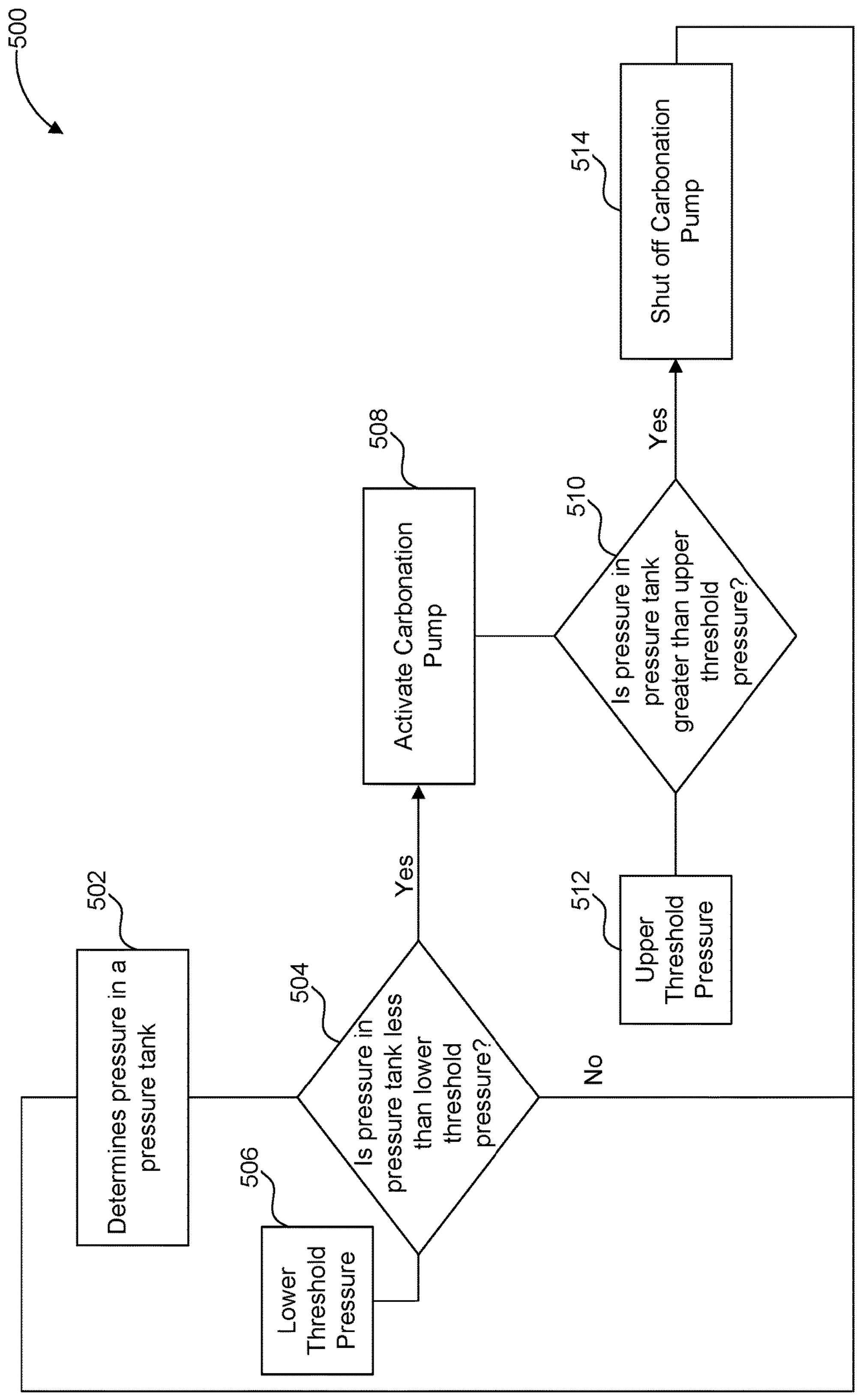
FIG. 5 is a flow chart illustrating a method of dispensing a beverage from a beverage dispenser converted from a carbonated beverage dispenser to a non-carbonated beverage dispenser according to some embodiments.

A pressure in pressure tank 204 may be monitored by a pressure switch 202. Pressure switch 202 may also be operatively coupled to carbonation pump 106. Pressure switch 202 may be configured to operate carbonation pump 106. According to some embodiments, pressure switch 202 may turn on carbonation pump 106 when a pressure in pressure tank 204 falls below a lower threshold pressure. Pressure switch 202 may shut off carbonation pump 106 when the pressure in pressure tank 204 is above an upper threshold pressure. FIG. 5 shows a flow chart illustrating a method of monitoring a pressuring in a pressure tank and adjusting the pressure accordingly.

Figure 3:
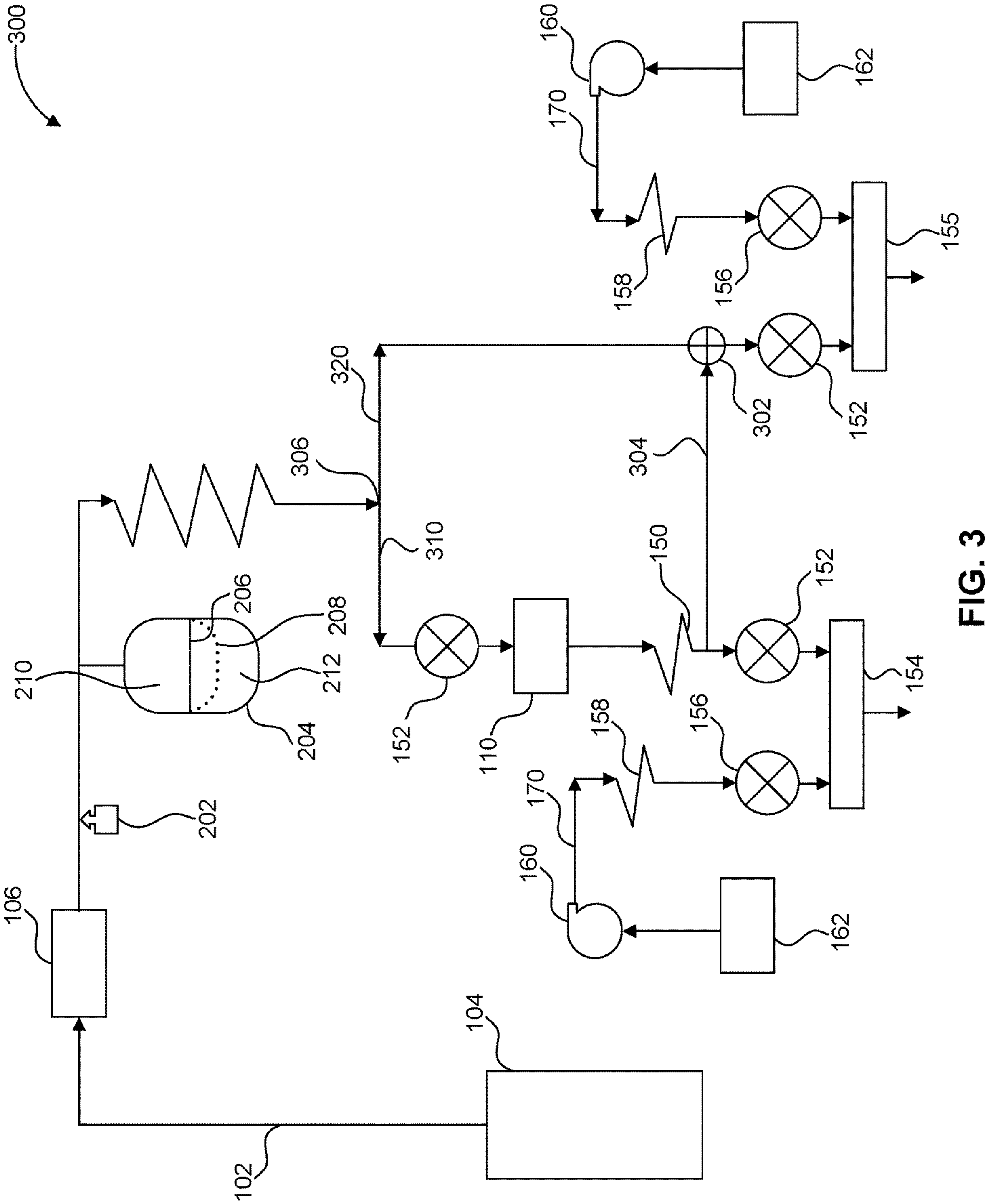
FIG. 3 shows a schematic of a non-carbonated beverage dispenser according to some embodiments.

FIG. 3 shows an embodiment according to the present disclosure. Beverage supply line 102 divides at junction 306 to a carbonated beverage supply line 310 and a non-carbonated beverage supply line 320. Carbonated beverage supply line 310 has solenoid 152 and carbonation tank 110. Carbonated beverage supply line 310 operates similar to a conventional carbonated beverage dispenser. Water enters carbonation tank 110 where carbon dioxide gas diffuses into the water to form carbonated water. The carbonated water may then be dispensed through mixing nozzle 154 as a carbonated beverage. Beverage dispenser 300 shown in FIG. 3 also includes a flex valve 302. Flex valve 302 is fluidly coupled to non-carbonated beverage supply line 320, a carbonated water cross feed line 304, and second mixing nozzle 155. Flex valve 302 allows the operator of beverage dispenser 300 to select the water source for second mixing nozzle 155. In one mode of operation, flex valve 302 supplies carbonated water from carbonated beverage supply line 310 via carbonated water cross feed line 304. In this mode, second mixing nozzle 155 dispenses a carbonated beverage. In another mode of operation, flex valve 302 supplies non-carbonated water from non-carbonated beverage supply line 320. In this mode, second mixing nozzle 155 dispenses a non-carbonated beverage.

Figure 4:
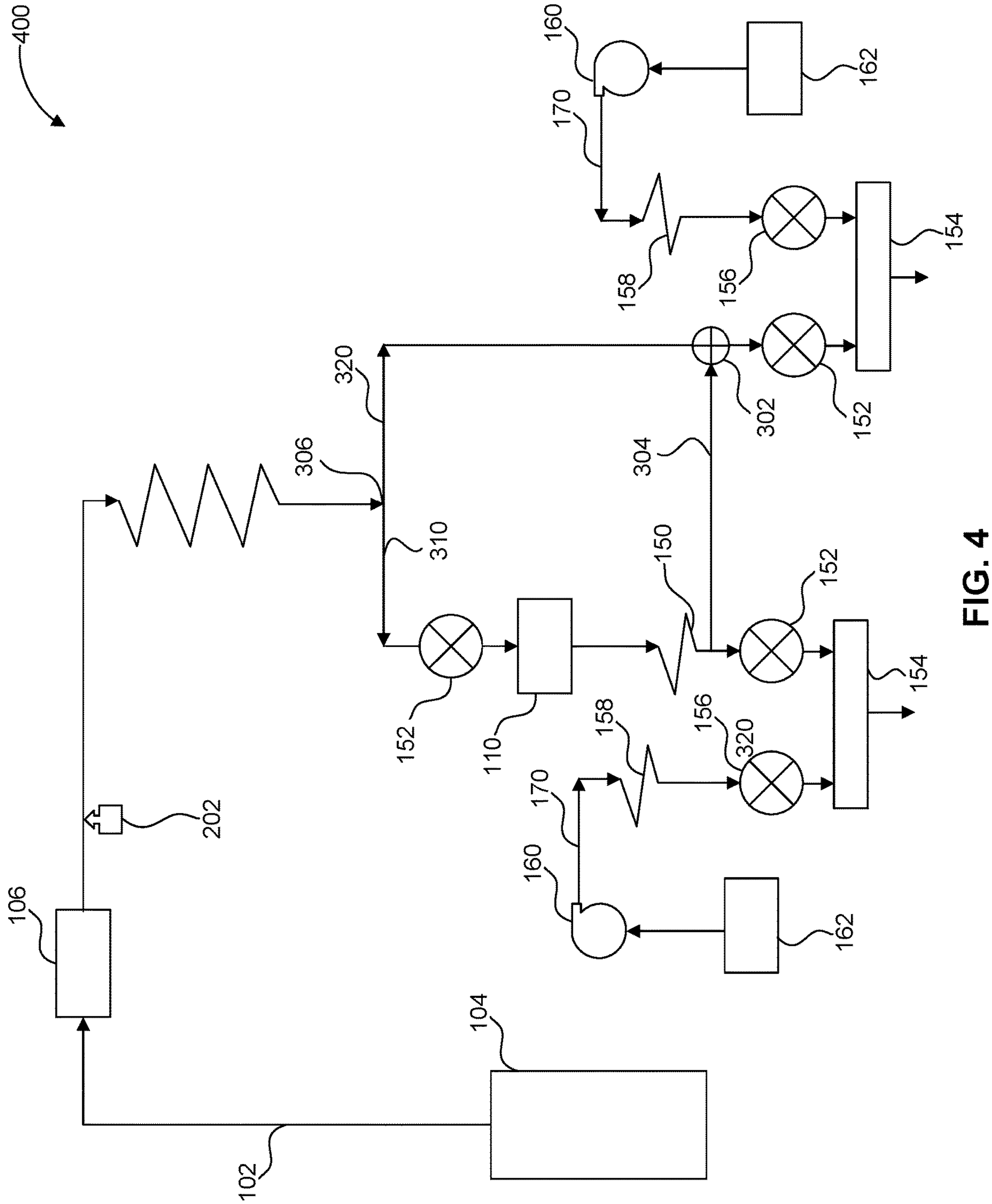
FIG. 4 shows a schematic of a non-carbonated beverage dispenser according to some embodiments.

FIG. 4 shows a beverage dispenser 300 according to some embodiments. Beverage dispenser 300 may have components similar to those disclosed and described with reference to FIGS. 1-3. FIG. 4 shows beverage dispenser 300 with a carbonation pump 106. Carbonation pump 106 drives water through beverage supply line 102 to junction 306. Carbonation pump 106 also drives water into As shown in FIG. 5, the method may include determining a pressure in a pressure tank 502. The pressure in the pressure tank is compared 504 to a lower threshold pressure 506. If the pressure in the tank is less than a lower threshold pressure 506, the method may include activating a carbonation pump 508. The pressure in the pressure tank may continue to be monitored when the carbonation pump is running. The pressure in the pressure tank may continually be compared to an upper threshold pressure 512. When the pressure in the tank is greater than the upper threshold pressure 512 (upper threshold comparison 510), the carbonation pump may be shut off 514. The process may continue indefinitely so that the pressure in the carbonation tank remains sufficient to supply the beverage dispenser with sufficient pressure to dispense a beverage.

In some embodiments, the upper threshold pressure 512 may be pressure near an upper pressure limit of the pressure tank. The lower threshold pressure 506 may be greater than a minimum pressure required to operate the beverage dispenser. In some embodiments, it may only be necessary to intermittently operate carbonation pump 106. Operating carbonation pump 106 only when necessary to charge the pressure in the pressure tank may contribute to operational savings and energy efficiencies because the excess energy generated by the carbonation pump 106 may be stored in the pressure tank. In some embodiments, carbonation pump 106 may be configured to engage for minimum intervals to reduce power waste during carbonation pump 106's startup operations. In some embodiments, the carbonation pump may charge the pressure tank to a pressure between 30 to 40 PSI for low pressure beverage dispensing and between 60 to 120 PSI for high pressure beverage dispensing.

According to some methods of converting a carbonated beverage dispenser to a non-carbonated beverage dispenser, a pressure regulator 220 may also be installed before mixing nozzle 154. Pressure regulator 220 may lower the pressure of the beverage before it is dispensed by mixing nozzle 154. This prevents the beverage from being dispensed at too high of a pressure. Pressure regulator 220 also allows carbonation pump 106 to pressurize the pressure tank to a higher level without concern that the excess pressure will be quickly released when the dispensing mechanism is activated. This enhances the user experience by protecting the user from expected blasts of water. In some embodiments, pressure regulator 220 is integral to solenoid valve 152. That is, solenoid valve 152 not only controls the release of the carbonated water to mixing nozzle 154, it also ensure that the carbonated water is released at an appropriate pressure.

Figure 6:
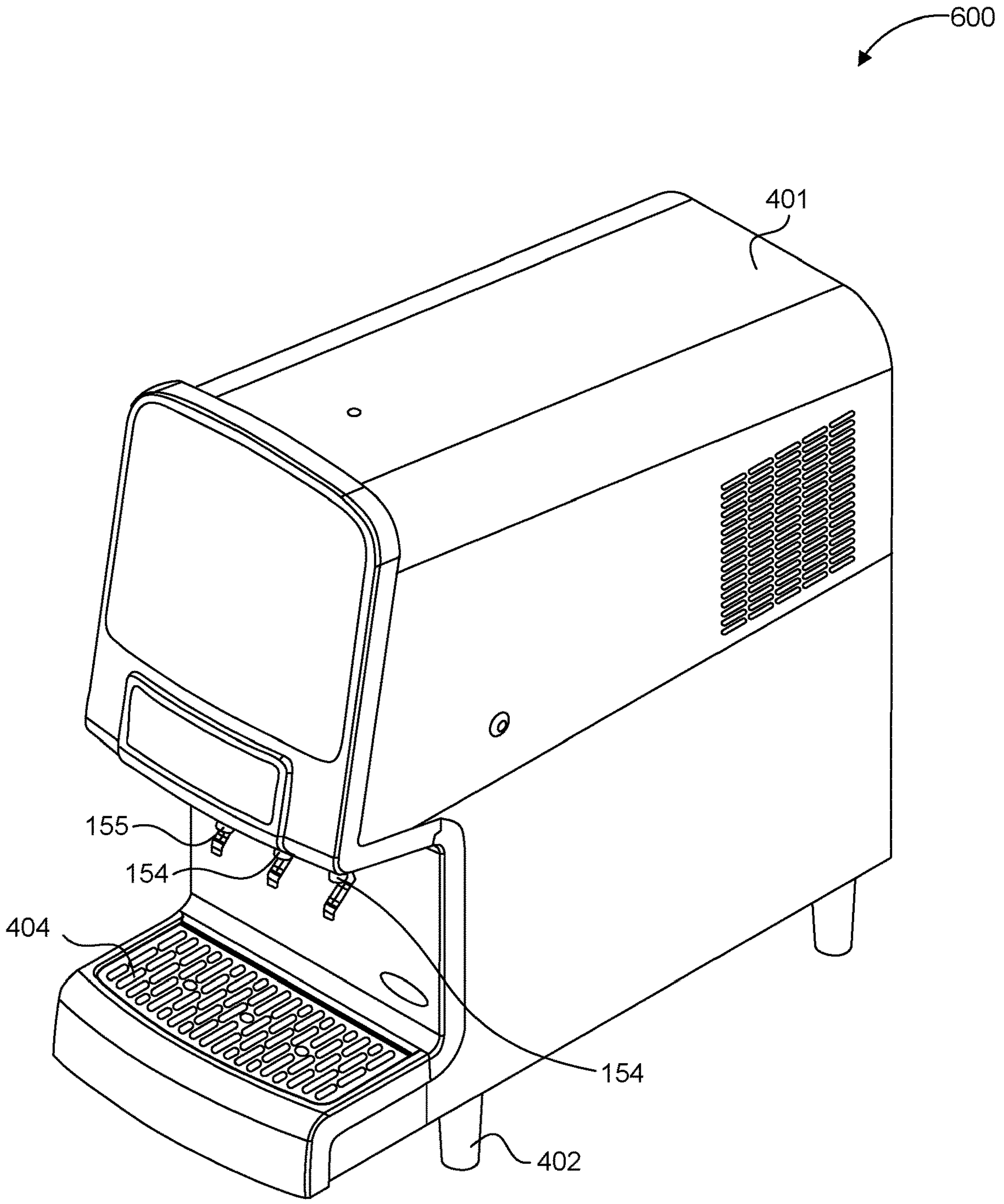
FIG. 6 shows a perspective view of a beverage dispensing system according to some embodiments.

FIG. 6 shows a perspective view of a beverage dispenser 400 according to some embodiments. Beverage dispenser 400 may include internal systems such as those disclosed herein. Beverage dispenser 400 may include a housing 401. Housing 401 may enclose beverage dispensing systems and may be located on a dispenser platform 402. Dispenser platform 402 may include a drip system 404 configured to collect drops of beverage or beverage components that may drip from mixing nozzles 154, 155.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the applicant, and thus, are not intended to limit the present invention and the claims.

The phraseology or terminology used herein is for the purpose of description and not limitation, such that the terminology or phraseology of the present specification is to be interpreted by the skilled artisan.

The breadth and scope of the present disclosure should not be limited by any of the above-described exemplary embodiments, but should be defined only in accordance with the claims and their equivalents.

What is claimed is:

1. A beverage dispenser comprising:

a beverage supply line fluidly coupled to a water source;

a carbonated beverage supply line fluidly coupled to the beverage supply line;

a non-carbonated beverage supply line fluidly coupled to the beverage supply line;

a mixing nozzle fluidly coupled to a beverage component source;

a flex valve fluidly coupled to the carbonated beverage supply line, the non-carbonated beverage supply line, and the mixing nozzle;

a pressure tank;

a pressure switch configured to monitor the pressure in the pressure tank;

a pressure regulator fluidly coupled to the pressure tank and the mixing nozzle; and a user interface configured to receive a user input, the user input comprising a selection of a carbonated beverage or a non-carbonated beverage, wherein the flex valve is configured to switch between a first mode and a second mode in response to the user interface receiving the user input, wherein the beverage dispenser is configured to dispense a carbonated beverage through the mixing nozzle in the first mode, and wherein the beverage dispenser is configured to dispense a non-carbonated beverage through the mixing nozzle in the second mode.

2. The beverage dispenser of claim 1, wherein, in the first mode, the flex valve is configured to supply a carbonated fluid from the carbonated beverage supply line to the mixing nozzle and prevent flow of a non-carbonated fluid from the non-carbonated beverage supply line to the mixing nozzle, and wherein, in the second mode, the flex valve is configured to supply a non-carbonated fluid from the non-carbonated beverage supply line to the mixing nozzle and prevent flow of a carbonated fluid from the carbonated beverage supply line to the mixing nozzle.

3. The beverage dispenser of claim 1, wherein the pressure tank is a hydro-pneumatic tank.

4. The beverage dispenser of claim 1, further comprising a carbonation pump, and wherein the pressure switch is configured to operate the carbonation pump.

5. The beverage dispenser of claim 4, wherein the pressure switch is configured to turn on the carbonation pump when the pressure in the pressure tank falls below a threshold pressure.

6. The beverage dispenser of claim 5, wherein the pressure switch is configured to turn off the carbonation pump when the pressure in the pressure tank exceeds a second threshold pressure.

7. The beverage dispenser of claim 1, further comprising a pump configured to pump a first beverage component from the beverage component source.

8. The beverage dispenser of claim 1, wherein the pressure regulator is configured to regulate the pressure in the beverage supply line.

9. The beverage dispenser of claim 8, further comprising a first solenoid valve configured to release the carbonated beverage or the non-carbonated beverage into the mixing nozzle.

10. The beverage dispenser of claim 9, wherein the pressure regulator is integral with the first solenoid valve.

11. The beverage dispenser of claim 9, further comprising a second solenoid valve configured to release the first beverage component from the beverage component source.

12. The beverage dispenser of claim 1, wherein the pressure tank comprises a first chamber, a second chamber, and a diaphragm disposed in the second chamber.

13. The beverage dispenser of claim 12, wherein the first chamber is configured to receive water from the water source such that the diaphragm is displaced into the second chamber to increase the pressure in the second chamber.

14. A method of dispensing a beverage from a beverage dispenser, the method comprising:

supplying water from a water source to a carbonation beverage supply line and to a non-carbonated beverage supply line;

monitoring, by a pressure switch, pressure in a pressure tank;

activating a carbonation pump when the pressure switch detects that the pressure in the pressure tank falls below a first threshold pressure;

receiving a user input, the user input comprising a selection of a carbonated beverage or a non-carbonated beverage;

switching a flex valve between a first mode and a second mode in response to receiving the user input;

flowing carbonated water through the flex valve when the flex valve is in the first mode;

flowing non-carbonated water through the flex valve when the flex valve is in the second mode;

flowing a first beverage component from a beverage component source to a mixing nozzle;

adjusting, by a pressure regulator, pressure of the carbonated water;

mixing the carbonated water with the first beverage component to dispense a carbonated beverage through the mixing nozzle when the flex valve is in the first mode; and mixing the non-carbonated water with the beverage component to dispense a non-carbonated beverage through the mixing nozzle when the flex valve is in the second mode.

15. The method of claim 14, further comprising deactivating the carbonation pump when the pressure switch detects that the pressure in the pressure tank exceeds a second threshold pressure.

16. The method of claim 14, wherein the pressure tank comprises a first chamber, a second chamber, and a diaphragm disposed in the second chamber.

17. The method of claim 16, further comprising:

flowing water from the water source into the first chamber such that the diaphragm is displaced into the second chamber to increase the pressure in the second chamber.

18. The method of claim 14, further comprising:

receiving a second user input related to a beverage size option; and dispensing a predetermined volume of the carbonated beverage or the non-carbonated beverage in response to the user input and the second user input.

19. A beverage dispenser comprising:

a beverage supply line fluidly coupled to a water source;

a carbonated beverage supply line fluidly coupled to the beverage supply line;

a non-carbonated beverage supply line fluidly coupled to the beverage supply line;

a pump configured to pump a beverage component from a beverage component source to a mixing nozzle;

a flex valve fluidly coupled to the carbonated beverage supply line, the non-carbonated beverage supply line, and the mixing nozzle, the flex valve configured to switch between a first mode in which the flex valve supplies carbonated water from carbonated beverage supply line to the mixing nozzle and a second mode in which the flex valve supplies non-carbonated water from the non-carbonated beverage supply line to the mixing nozzle; and a pressure tank;

a pressure switch configured to monitor the pressure in the pressure tank;

a pressure regulator fluidly coupled to the pressure tank and the mixing nozzle;

wherein the pressure regulator configured to adjust pressure of the carbonated water;

a user interface configured to receive a first user input and a second under input;

wherein the flex valve is configured to switch between the first mode and the second mode in response to the user interface receiving the first user input; and wherein the second user input is related to a beverage size option from a menu of options.

20. The beverage dispenser of claim 4, wherein the pressure switch is disposed between and fluidly coupled to the pressure tank and the carbonation pump, and wherein pressure regulator is disposed between the pressure tank and the mixing nozzle.

21. The beverage dispenser of claim 19, wherein the beverage dispenser is configured to adjust the temperature of the carbonated water or the non-carbonated water.

* * * * *